US008737964B2

(12) United States Patent
Koraichi

(10) Patent No.: US 8,737,964 B2
(45) Date of Patent: May 27, 2014

(54) FACILITATING AND AUTHENTICATING TRANSACTIONS

(75) Inventor: Najib Koraichi, Schimmert (NL)

(73) Assignee: Vodafone Group PLC, Newbury, Berkshire (GB)

( * ) Notice: Subject to any disclaimer, the term of this patent is extended or adjusted under 35 U.S.C. 154(b) by 1524 days.

(21) Appl. No.: 11/910,230

(22) PCT Filed: Feb. 23, 2006

(86) PCT No.: PCT/GB2006/000637
§ 371 (c)(1),
(2), (4) Date: Jun. 26, 2008

(87) PCT Pub. No.: WO2006/103383
PCT Pub. Date: Oct. 5, 2006

(65) Prior Publication Data
US 2009/0215431 A1   Aug. 27, 2009

(30) Foreign Application Priority Data

Mar. 31, 2005   (GB) .................................. 0506570.1
Apr. 14, 2005   (GB) .................................. 0507587.4

(51) Int. Cl.
*H04M 1/66*      (2006.01)
*H04W 4/00*      (2009.01)
*H04M 1/00*      (2006.01)
*H04K 1/00*      (2006.01)
*H04L 9/32*      (2006.01)

(52) U.S. Cl.
USPC ........... 455/411; 455/466; 455/558; 380/247; 713/170

(58) Field of Classification Search
USPC ............... 455/558, 466, 411; 726/4; 380/247; 713/170
See application file for complete search history.

(56) References Cited

U.S. PATENT DOCUMENTS 7,848,522 B2 *  12/2010  Haverinen ..................... 380/247
2001/0045451 A1  11/2001  Tan et al.
(Continued)

FOREIGN PATENT DOCUMENTS

GB   2378094        1/2003
GB   2394326 A      4/2004
(Continued)

OTHER PUBLICATIONS

Search Report for GB0507587.4 dated Aug. 3, 2005.
(Continued)

*Primary Examiner* — Kent Chang
*Assistant Examiner* — Kuo Woo
(74) *Attorney, Agent, or Firm* — Workman Nydegger

(57) ABSTRACT

A computer, such as a Windows-based PC 23, has associated with it a Subscriber Identity Module (SIM) 15, such as of the type used in a GSM or UMTS cellular or mobile telecommunications network. The SIM 15 can be authenticated with the network 3 in the same way as for authenticating SIMs of mobile telephone handsets used in the network, and can in this way authenticate the user of the PC 23 or the PC 23 itself. Such authentication can, for example, permit use of the PC 23 in relation to a particular application running on the PC 23. Challenge and response messages are transmitted between the network 3 and the SIM 15 via an authenticator module 30 implemented on the PC 23. These authentication messages have the predetermined format of an Over The Air (OTA) message, which is also used in GSM or UMTS telecommunications networks to transmit non-authentication messages—for example, SMS messages. The authentication data is encapsulated within OTA messages. The OTA messages are not necessarily transmitted wirelessly (that is, over the air). They may be transmitted via a fixed network; however, they have the predetermined format of OTA messages.

38 Claims, 5 Drawing Sheets

(56) References Cited

U.S. PATENT DOCUMENTS

2003/0012159 A1    1/2003    Vassilovski et al.
2003/0105962 A1*   6/2003    Le et al. .................... 713/170
2003/0224823 A1*  12/2003    Hurst et al. ................. 455/558

FOREIGN PATENT DOCUMENTS

| | | |
|---|---|---|
| GB | 2394327 A | 4/2004 |
| GB | 2406925 A | 4/2005 |
| GB | 2406928 A | 4/2005 |
| JP | 10-124635 | 5/1998 |
| WO | 2004036467 | 4/2004 |
| WO | WO2004036513 A1 | 4/2004 |
| WO | WO2004036866 A1 | 4/2004 |
| WO | WO2004086676 | 10/2004 |

OTHER PUBLICATIONS

Stage 2;(3GPP TS 03.48 version 8.8.0 Release 1999), Dec. 1, 2001 D5, pp. 1-35, XP55042728, Retrieved from the Internet: URL:http://www.3gpp.org/ftp/Specs/html-info/0348.html [retrieved on Oct. 31, 2012].

Wireless Communications and Networking Conference, 2004, Mar. 21-25, 2004, vol. 2, pp. 889-893, Badra, M. & Urien, P., "Toward SSL integration in SIM SmartCards", INSPEC Accession No. 8134187. See the whole document.

* cited by examiner

FACILITATING AND AUTHENTICATING TRANSACTIONS

TECHNICAL FIELD

The invention relates to the facilitation and authentication of transactions. In embodiments of the invention, to be described below in more detail by way of example only, transactions between data processing apparatus (such as a personal computer), or a user thereof, and a (possibly remote) third party are facilitated and authenticated, and such facilitation and authentication may also involve the facilitation and authentication of a payment or data transfer to be made by or on behalf of the user to the third party.

SUMMARY OF THE INVENTION

According to a first aspect of the invention, there is provided a method of authenticating an entity, the method including providing that entity with authentication storage means having authentication information stored thereon; coupling the authentication storage means to authenticating means via a plurality of elements of a communications network for exchanging data between the authentication storage means and the authenticating means to authenticate the entity with the authenticating means; wherein said data is transmitted in messages having a predetermined message format recognisable and transmissible by each of said elements in the communications network, which message format is also used to transmit non-authentication data by each of said elements.

According to a another aspect of the invention, there is provided apparatus for authenticating an entity, the apparatus including authentication storage means having authentication information stored thereon; authenticating means for coupling to the authentication storage means via a plurality of elements of a communications network for exchanging data between the authentication storage means and the authenticating means to authenticate the entity with the authenticating means; and means for transmitting said data in messages having a predetermined message format recognisable and transmissible by each of said elements in the communications network, which message format is also used to transmit non-authentication data by each of said elements.

According to a another aspect of the invention, there is provided authentication storage means for authenticating an entity having authentication information stored thereon, the authentication storage means being connectable to authenticating means via a plurality of elements of a communications network for exchanging data between the authentication storage means and the authenticating means to authenticate the entity with the authenticating means; and including means for transmitting said data in messages having a predetermined message format recognisable and transmissible by each of said elements in the communications network, which message format is also used to transmit non-authentication data by each of said elements.

BRIEF DESCRIPTION OF THE DRAWINGS

A method, apparatus and authentication storage means according to the invention for facilitating and authenticating transactions involving data processing apparatus such as a personal computer, embodying the invention, will now be described, by way of example only, with reference to the accompanying diagrammatic drawings in which.

In the figures like elements are generally designated with the same reference numbers.

DESCRIPTION OF MODE OF CARRYING OUT THE INVENTION

Figure 1:
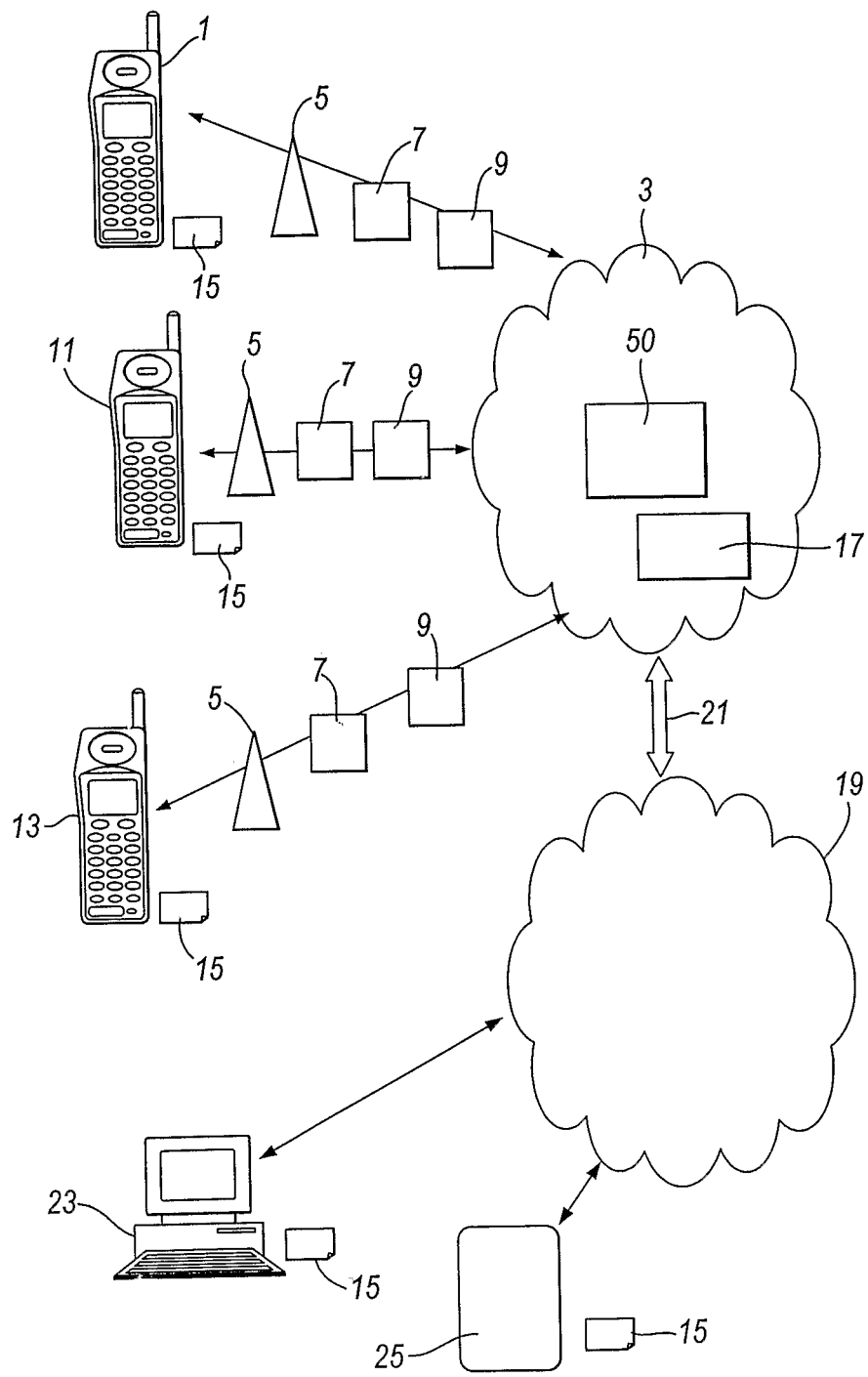
FIG. 1 shows the basic elements of a telecommunications network.

There exist many instances when a transaction involving the use of data processing apparatus requires authentication. For example, the data processing apparatus may be required to carry out a transaction, such as the exchange of information, with a third party, such as a remote third party with which the communication must be made over a telecommunications link (including via the Internet). The third party may require that the data processing apparatus, or the user thereof for the time being, is authenticated to the satisfaction of the third party before the transaction takes place.

As stated, the transaction may merely involve the exchange of information. For example, the user of the data processing apparatus may simply need to be authenticated in order to download information from the third party. Such information may be information kept by the third party on behalf of the user of the data processing apparatus (for example, information relating to the user's bank account). Instead, the information might be information held on other data processing apparatus, such as a data network belonging to an organisation or commercial entity with which the user is connected or by whom the user is employed, thus facilitating access to that network by the user when the user is travelling. Another possible transaction may involve the downloading by the data processing apparatus of software from the remote location.

In addition, the transaction may require a payment to be made by the user in order to enable the transaction to take place, such as a payment to the third party in return for the information provided. Clearly, when such a payment is involved, it is important that the user is authenticated to the satisfaction of the third party and that the payment is made in a safe, simple and secure manner.

Although the foregoing discussion has referred to a "user" of the data processing apparatus, some at least of the transactions described above may not in fact involve any human user: the data processing apparatus may be required to operate automatically (for example, intermittently operating in an information-gathering or monitoring role, and reporting the results to a third party). In such cases, it may alternatively or additionally be necessary for the data processing apparatus to authenticate itself to the satisfaction of the third party.

The data processing apparatus is provided with, or associated with, means (authentication storage means) for storing predetermined authentication information for authenticating that apparatus or a particular user thereof. In one embodiment, the means for storing the predetermined information is removable and can thus be taken by the user and inserted into any data processing apparatus (or computer) which is adapted to receive it, so as to enable that user to be authenticated in respect to a transaction to be carried out by that user with that computer. Advantageously, in such a case the means for storing the predetermined information comprises a smart card.

In a more specific example, the smart card is a Subscriber Identity Module or SIM of the type used in and for authenticating the use of handsets in a mobile or cellular telecommunications network—such as a GSM (Group Special Mobile) or UMTS/3G (Third Generation) network. Although the term "SIM" is used herein, it should be appreciated that the SIM may be a 3G USIM, an ISIM (IP-based Multimedia Subsystem—IMS), SIM, or a Universal 1C Card (UICC—a smart card platform defined by ETSI SCP on which a SIM, USIM or ISIM can reside).

FIG. 1 shows a UMTS (3G) mobile or cellular network. Mobile terminal 1 is registered with the UMTS (3G) mobile telecommunications network 3. The mobile terminal 1 may be a handheld mobile telephone, a personal digital assistant (PDA) or a laptop computer equipped with a datacard. The mobile terminal 1 communicates wirelessly with mobile telecommunications network 3 via the radio access network (RAN) of the mobile telecommunications network 3, comprising, in the case of a UMTS network, base station (Node B) 5, and radio network controller (RNC) 7. Communications between the mobile terminal 1 and the mobile telecommunications network 3 are routed from the radio access network via serving GPRS support nodes (SGSN) 9, which may be connected by a fixed (cable) link to the mobile telecommunications network 3.

In the conventional manner, a multiplicity of other mobile terminals are registered with the mobile telecommunications network 3. These mobile terminals include mobile terminals 11 and 13. The terminals 11 and 13 communicate with the mobile telecommunications network 3 in a similar manner to the terminal 1, that is via an appropriate Node B 5, RNC 7 and SGSN 9.

The mobile telecommunications network 3 includes a gateway GPRS support node (GGSN) 17 which enables IP-based communications with other networks, such as the Internet 19 via an appropriate link 21. A multiplicity of terminals are connected to the Internet (by fixed or wireless links), and a PC terminal 23 and a PDA terminal 25 are shown by way of example.

Each of the mobile terminals 1,11 and 13 is provided with a respective SIM 15. During the manufacturing process of each SIM, authentication information is stored thereon under the control of the mobile telecommunications network 3. The mobile telecommunications network 3 itself stores details of each of the SIMs issued under its control (including the authentication information) in the SIM management function 50. According to the embodiment described, this authentication information includes a plurality of key sets, which can be used to encrypt/decrypt communications with the SIM.

In normal operation of the mobile telecommunications network 3, a terminal 1, 11, 13 is authenticated (for example, when the user activates the terminal in the network with a view to making or receiving calls) by the network sending a challenge to the terminal 1,11,13 incorporating a SIM 15, in response to which the SIM 15 calculates a reply (dependent on the predetermined information held on the SIM—typically an authentication algorithm and a unique key Ki) and transmits it back to the mobile telecommunications network 3. The SIM management function 50 of the mobile telecommunications network 3 generates the challenge and which receives the reply from the terminal 1,11,13. Using information pre-stored concerning the content of the relevant SIM 15, the authentication function 50 calculates the expected value of the reply from the mobile terminal 1,11,13. If the reply received matches the expected calculated reply, the SIM 15 and the associated mobile terminal (and the user thereof) are considered to be authenticated.

It should be understood that such an authentication process can be performed for any terminal provided with a SIM 15 under control of the mobile telecommunications network 3. When the terminal is a mobile telephone handset, the terminal communicates wirelessly with the mobile telecommunications network 3 via the network's radio access network, although this is not essential. For example, the terminal may communicate with the network via the fixed telephone network (PSTN), via a UMA "access point" and/or via the Internet. The PC 23 and the PDA 25 may also be provided with a SIM 15 under the control of the network, and these SIMs permit authentication also—although not necessarily by transmission of authentication data via the RAN of network 3.

The format of messages sent to perform authentication varies in dependence upon the type of SIM (e.g. SIM, USIM, ISIM, UICC) used and the type of authentication. Conventionally, each of the components of the telecommunications system shown in FIG. 1 will be configured to handle authentication messages having a particular one of these formats. If the type of SIM is changed, this would require each of the telecommunication system components to be modified. The embodiment described overcomes this problem by transporting the authentication messages in an (Over The Air) OTA data packet or envelope having a standard format—for example, as described in ETSI and 3GPP Standard TS 23.048 "Security Mechanisms for the (U)SIM Application Toolkit—Stage 2", which is hereby incorporated by reference. The telecommunication system, components can transport the OTA data packet or envelope if they are compatible with the standard, irrespective of the format of the content of the OTA data packet or envelope. Indeed, the authentication messages need not be in the format conventionally used for a SIM, but may have a different format.

The SIM 15 used by the terminal 1,11,13,23,25 may be a SIM of the type defined in the GSM or UMTS standards specifications, or may be a simulation of a SIM—that is, software or hardware that performs a function corresponding to that of the SIM (which may itself be embedded in another device). The SIM may be in accordance with the arrangement described in WO-A-2004 036513.

It should be noted that the authentication process being described does not necessarily authenticate the human identity of the user. For example, cellular telecommunication networks have pre-pay subscribers who are issued with SIMs in return for pre-payment enabling them to make calls on the network. However, the identity of such pre-pay subscribers is not known (or not necessarily known) by the networks. Nevertheless, such a user cannot make use of the network until the network has authenticated that user's SIM—that is, has confirmed that such user is a particular user who has a particular pre-paid account with the network. The SIMs of such pre-paid users or subscribers could equally well be used (in the manner described) in or in association with data processing apparatus or computers, for the purposes of authenticating that user.

It may be desirable to be able to change the authentication information on the SIM (or simulated SIM) to take account of changed circumstances. For example, the SIM may be a SIM registered with a particular cellular telecommunications network—a network applicable to the country or region where the data processing apparatus or computer is to be used. However, circumstances may arise (for example, the apparatus or the computer is physically moved to a different country or region) in which it is desirable or necessary to re-register the SIM with a different cellular telecommunications network. Ways in which this can be done are disclosed in our co-pending United Kingdom patent applications Nos.

0118406.8, 0122712.3 and 0130790.9 and in our corresponding PCT applications Nos. GB02/003265, GB02/003260 and GB02/003252. As described therein in more detail, a SIM (and thus also a simulated SIM) may be initially provided with authentication (and other) information relating to each of a plurality of networks, the information respective to the different networks being selectively activatable.

It is not necessary, however, for the users to be subscribers to a telecommunications network. Instead, they could be subscribers registered with some other centralised system which could then carry out the authentication process in the same way as in a telecommunications network. In such a case, the registration of a SIM (or simulated SIM) could be transferred from one such centralised system to another in the same manner as described above.

As described above, an aim of the authentication process in the embodiment to be described is to facilitate a transaction between the data processing apparatus or computer and a third party. Where the authentication process is carried out by a telecommunications network, or by some other system, to which the user of the SIM is a subscriber, the satisfactory completion of the authentication process would then be communicated by that network or system to the third party—to enable the transaction to proceed.

For many transactions of the type described, a payment by the user to the third party may be involved. An arrangement as described above, in which the authentication process is carried out by a telecommunications network or other centralised system to which the user is a subscriber advantageously facilitates the making of such payments and is particularly advantageous where (as may often be the case) the payment is for a small amount (for example, payment in return for receipt of information—e.g. weather or traffic information, or for temporary use of specific software); in such a case, the payment can be debited to the account of the subscriber held by the telecommunications network or other centralised system—and then, of course, passed on to the third party, perhaps after deduction of a handling charge.

Figure 2:
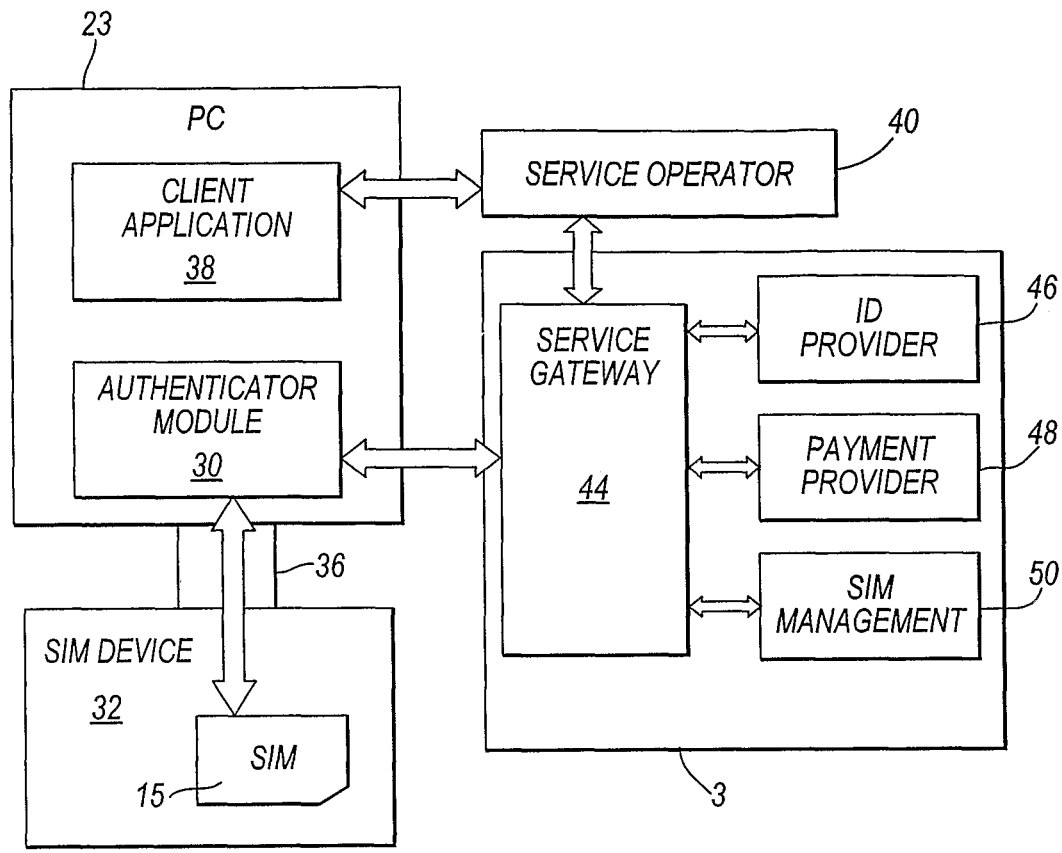
FIG. 2 is a block diagram for explaining the operation of the method in relation to the data processing apparatus.

The block diagram of FIG. 2 schematically illustrates one way of operating the method described above.

A client platform, such as a Windows® based PC 23, includes an authenticator module 30 which forms part of a client sub-system which supports a SIM Application Toolkit-like command set which provides a bearer independent protocol for communication with other devices. The SIM Application Toolkit is described in ETSI and 3GPP Specifications TS 11.11 TS 31,111, TS 11.14 and TS 102.223, which are in the public domain and hereby incorporated by reference. The commands supported by the authenticator module 30 are hereinafter referred to as "SIMTALK" commands. The authenticator module 30 includes a SIMTALK interpreter, which creates SIMTALK data packets. These data packets are transmitted using standardised secure OTA mechanisms—to be described in more detail below. A SIM device 32 having a SIM 15 therein is provided, and communication between the SIM device 32 and the authenticator module 30 is performed via connection 36 (which may be a wired or wireless connection). The SIM device 32 is capable of receiving and processing SIMTALK commands. The SIM device 32 maps received SIMTALK data packets onto Card Application Toolkit (CAT) to transport the SIMTALK commands to the SIM 15. The CAT commands are bearer independent protocol commands as defined in the ETSI SCP CAT Specification TS 102.223, which is in the public domain and hereby incorporated by reference. The SIM 15 may also create SIMTALK data packets; these are transferred to the SIM device 34 using CAT.

A client application 38 is provided on the PC 10, which allows the user to obtain services from a remote service operator 40. It should be understood that by "remote" it is not intended to imply that there must be a particular geographical distance between the PC 23 and the service operator 40. However, generally the service operator 40 will be controlled independently of the PC 23—although this is not essential.

In this embodiment a mobile telecommunication network 3 provides via a service gateway 44 an identity provider service 46, payment provider service 48 and SIM management service 50. The service gateway 44 is capable of receiving SIMTALK commands and of generating SIMTALK commands. It should be understood that the network 3 may be any type of network—the invention is not restricted to mobile telecommunication networks. For example, the service gateway 44 may be provided in a computer that is linked to PC 23 by a local area network, a wide area network and/or the Internet.

The SIM device 32 may comprise a "dongle" which allows wired or wireless communication with the PC 23. Preferably, the communication between the SIM (or smartcard) and the PC 23 is secure. The communications may be encrypted, or any other means for secure communication may be employed.

The dongle 32 may receive the SIM 15, or may incorporate software simulating the SIM 15. The dongle 32 allows data for authenticating a transaction (or for any other appropriate purpose) to be passed between the dongle 32 and the PC 23 and onwardly to/from the network 3. Appropriate connectors are provided within the dongle 32 for allowing electronic exchange of data between the SIM 15 and the dongle 32. The dongle 32 further comprises a suitable connector 36 for allowing connection for data communication purposes to the PC 23. For example, the connector could be a USB connector, a Firewire 1394 connector a SmartMedia® connector, a near field connector (e.g. using NFCIP-1 protocol), Bluetooth® connector, infra-red connector or any other suitable connector.

Figure 3:
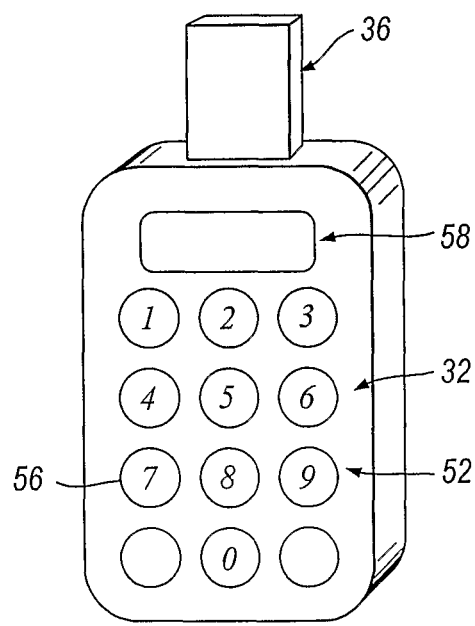
FIG. 3 is a perspective view of one configuration of a dongle.

The housing 52 of the dongle 32 shown in FIG. 3 has a variety of push buttons 56 mounted thereon, ten of which have respective numerals from 0 to 9 displayed thereon. In this embodiment, the dongle 32 includes means (such as software) for receiving the entry of a PIN number from a user by operating the appropriately designated push buttons 56. The housing 52 may further optionally provide a display 58 for prompting the user to enter their PIN number and/or for displaying the PIN number as it is entered, if desired, as well as other information.

It should be appreciated that as an alternative to push buttons 56, other means could be provided for allowing PIN entry. Alternatively, the user could be authorised to use the SIM 15 by obtaining some other security information from the user and comparing this with data stored on the SIM 15. For example, the data obtained could be the user's fingerprint or some other characteristic which is unlikely to re-occur on another person—for example, any suitable biometric data. The details of the fingerprint (or other information) may be stored on the SIM or by the network 3 ID provider 46 (or elsewhere) for comparison with the input data representing the characteristics.

In the above description it has been indicated that the SIM used to authenticate the transaction could have the form of a conventional SIM which is provided in the dongle 32. This could simply be the SIM that a subscriber to a mobile network uses in their conventional mobile telephone handset to make and receive calls. Alternatively, the SIM 15 could be removably fitted directly to the PC 23 or embedded within the PC 23

(such that it cannot be readily removed or cannot be removed at all). Further alternatively, the SIM may not have a separate physical form, but may be simulated by means of software and/or hardware within the PC 23 or the dongle 32. The SIM could be simulated or incorporated into the chip set of the PC 23. For example, the SIM could be incorporated or simulated within the central processor unit of the PC 23. Such an arrangement prevents the SIM (or simulated SIM) being removed from the PC 23 (other than by rendering the PC 23 useless).

If the SIM is of a form that is not readily removable from the PC 23 or dongle 32, a subscriber to the telecommunications system may be provided with a second SIM for use, for example, in their mobile telephone handset.

If, however, the same SIM is used (in the PC 23 or the dongle 32) to authenticate transactions and for use in the conventional manner with the telecommunications network (for example, to make and receive calls using a mobile telephone handset), the same data may be used to provide authentication of transactions as is used to authenticate the SIM with the mobile telephone network when a call is being made. Alternatively, the SIM may have separate records for performing each authentication type. There may be a first record containing data and/or algorithms for use in authenticating transactions, and a second, separate record for use in the conventional manner for authenticating the terminal with the telecommunications network. The first and second records may have respective authentication keys, unique identifiers to the telecommunications network and/or unique authentication algorithms. The mobile telephone handset need not be authenticated with the network 3 for the SIM to authenticate a transaction for the PC 23.

The dongle 32 may also perform the functions of a conventional data card for use with a PC (or other computing device). The dongle will therefore include means for wireless telecommunication with the network 3. With this arrangement, the dongle will be of a suitable size and will include suitable connectors for allowing it to operate as a data card, in addition to the dongle having the functions described above.

Figure 4:
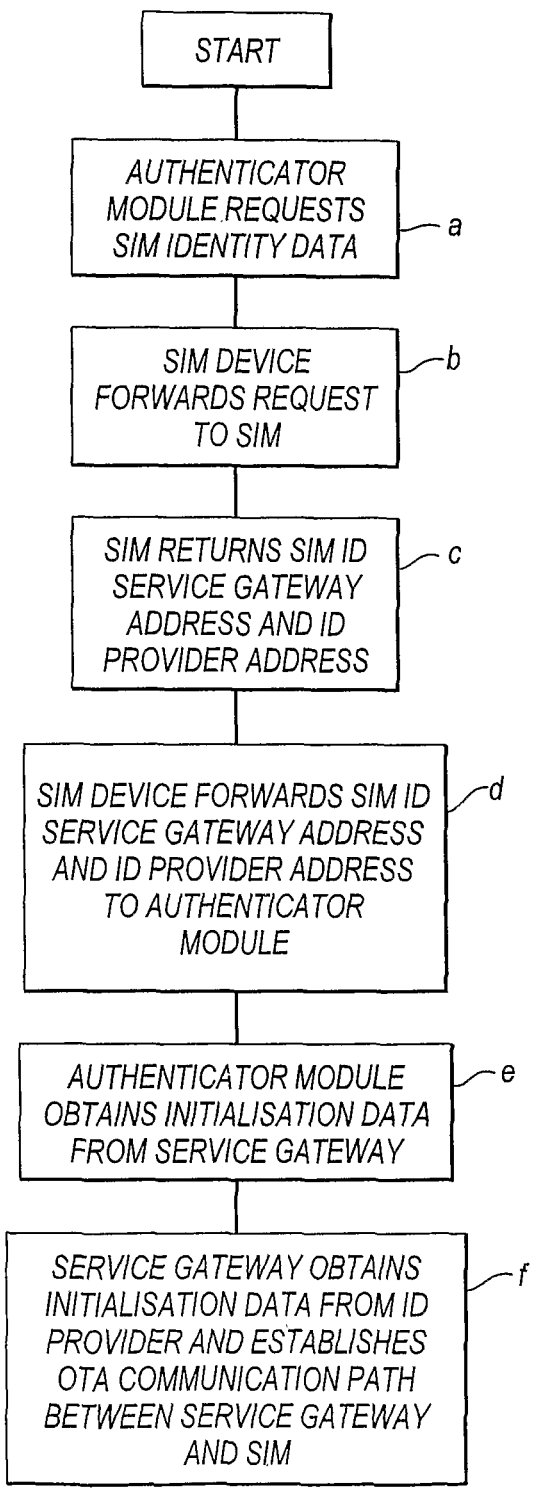
FIG. 4 is a flow chart for use in the understanding the establishment of a communication channel between a SIM and a network operator.

When the PC 23 is initially powered-up with the SIM 15 coupled thereto, or when the SIM 15 is first coupled to the already-on PC 23 (via the SIM device 32), the following initialisation process is performed, as illustrated by the flow chart of FIG. 4.

The authenticator module 30 requests from the SIM 15 data identifying that SIM, and an indication of the identity provider 46 and service gateway 44 to which it belongs (that is the identity provider and service gateway associated with the SIM management function 50 under the control of which the SIM 15 was issued, for example)—step a. These requests by the authenticator module 30 for data from the SIM 15 are passed from the authenticator module 30 to the SIM device 32. The SIM device 32 forwards the request to the SIM 15—step b. The SIM 15 returns its identity data, the service gateway 44 address and the address of its identity provider 46—step c. The SIM device 32 forwards this data to the authenticator module 30—step d.

The authenticator module 30 then contacts the service gateway 44 to request initialisation data therefrom—step e. The authenticator module 30 may be provided with a "global" key—for example, a key that is provided to all authenticator modules 30 issued under control of the network 3. Such a key may be obfuscated in implementation. Also, the key may be updated if it is compromised. The authenticator module 30 provides the global key to the service gateway 44 to verify the integrity of the authenticator module 30. The initialisation data request is passed by the service gateway 44 to the identity provider 46. The identity provider checks the SIM identity data, service gateway 44 address and identity provider 46 address, and if this information is determined to be correct, the identity provider 46 generates initialisation data for the service gateway 44 which enable the service gateway 44 to establish an OTA communication path to the SIM 15 (via the authenticator module 30 and SIM device 32)—step f. As indicated above, authentication information for each SIM is stored by the ID provider 46. The ID provider 46 selects a suitable key set (using key set data obtained from the SIM management function 50) for encrypting the content of the OTA data packets transmitted over the communication path. The header of each O'TA data packet includes an indication of the type of OTA data packet (e.g. SMS text message, authentication message, etc.) and an indication of the key set selected—but not the keys themselves. This header data is received by the SIM 15. If it is determined that the data packet is an authentication message, the SIMTALK commands are extracted and the key set indicator is identified. The corresponding key set provided in the SIM during manufacture is accessed and used to decrypt messages received from the service gateway during the communication session now established. Optionally, new key sets may be transmitted to the SIM and corresponding key sets stored in the SIM management function 50, in order to allow new key sets to be used to encrypt messages.

The OTA data packages are of a standard format as defined by the ETSI 3 GPP Standard TS 23.048, which is in the public domain and is incorporated herein by reference. The form of the OTA data packages is bearer-independent. The OTA data packet are not necessarily transmitted over the air. They may be transmitted over the air or they may be transmitted over a fixed (wired network) including the Internet.

Figure 5A:
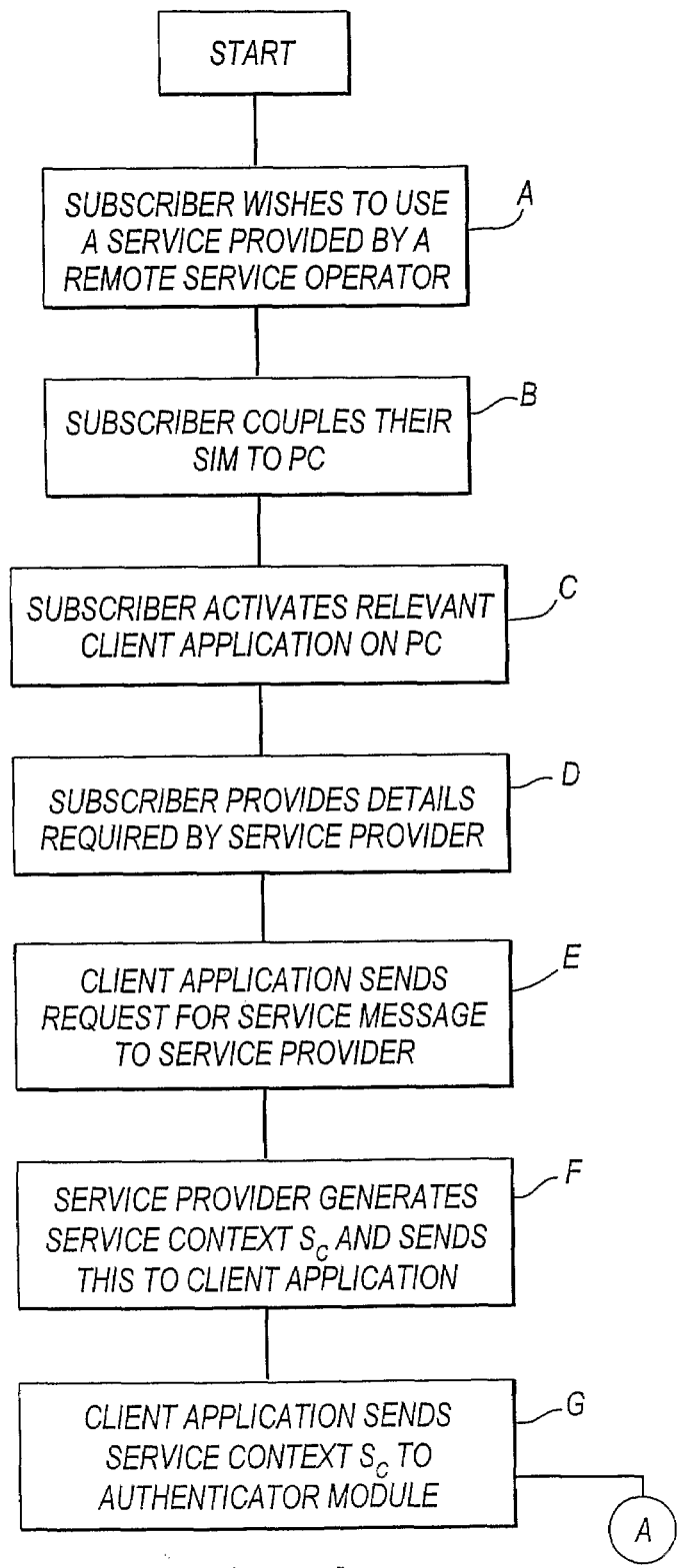
FIGS. 5A and 5B are a flow chart for use in understanding the authentication process carried out by the data processing apparatus of FIG. 2.

Reference will now be made to the flow chart of FIGS. 5A and 5B.

When the subscriber wishes to use a service provided by a remote service operator 40 (step A of the flow chart shown in FIG. 5A), the subscriber couples their SIM 15 to the PC 23 by inserting their dongle 32 containing the SIM 15 into the appropriate connecting slot of the PC 23 or using a wireless link (step B). The subscriber then activates on the PC 23 the relevant client application 38 to obtain a required service (step C). For example, the client application 38 could be special software provided by or under control of a service operator 40 for installation on the subscriber's PC 23. Alternatively, a client application 38 might be a web browser for visiting an appropriate web site of the service operator 40.

To illustrate the operation of the system shown in FIG. 2, an example will be given for a subscriber wishing to purchase a particular CD from a vendor which is a service operator 40. Using a graphical user interface present on the PC 23 the subscriber launches web browser software provided on the PC 23 and, via the Internet, accesses the web site of the service operator 40. The web browser software constitutes the client application 38, and allows access to the web site associated with the service operator 40 which distributes CDs.

Data communication between the client application 38 and the service provider 40 may be by a fixed network (e.g. PSTN) or by a wireless network—such as the network 3 or another mobile telecommunications network.

The subscriber then enters the details required by the service operator 40 (such as their name and address)—step D.

The subscriber searches the web site to identify the CD that the subscriber wishes to purchase. When the CD required by the subscriber is identified, the subscriber causes the client application 38 to send a request for service message to the service operator 40 (step E)—for example by making a mouse click on a "purchase CD" button provided by the web site. The message includes data identifying the CD required, data identifying the subscriber (such as the subscriber's SIM identifier), including a field indicating that the subscriber has installed on their PC an authenticator module 30 which can authenticate a transaction by means of the subscriber's SIM 15.

At this stage in the transaction, the service operator 40 has been provided with certain details of the subscriber, including the subscriber's name, address and the CD that they wish to order. This information might be provided by somebody who is not truly the subscriber. To authenticate the transaction the service operator 40 constructs a service context $S_C$ (step F). The service context is a data packet including the following fields:

An identifier of the service operator 40

The subscriber's name (or other identifier such as a SIM identifier)

Details of the transaction to be authenticated (in this case the purchase of a CD)

Additional or alternative information may of course also be provided.

The service context $S_C$ is sent via the Internet to the client application 32. The client application 32 passes the service context $S_C$ to the authenticator module 30 (step G). The client application 32 may add its own identifier to the service context $S_C$ to allow the network 3 to determine from which client application the transaction is derived.

The authentication module 30 analyses the service context and establishes that a request for authentication of the transaction by the network 3 is required. The authentication module 30 detects whether the subscriber's dongle 32 containing their SIM 15 is present (step H). If the dongle 32 is not present, the user is prompted to make their dongle available. The authentication module 30 may also display a description of the transaction to be authenticated—and the subscriber can be provided with the option to approve or disapprove the transaction. Assuming the dongle is present and the transaction is approved by the subscriber, the authentication module 30 then sends a request to the service gateway 44 of the network 3 for a security token $S_X$ (step I). The request sent to the service gateway 44 includes the service context $S_C$. That data may be transmitted over any suitable network. For example, the data may be transmitted via the Internet. The data may be transmitted over a fixed telephone network, or over the mobile or cellular infrastructure of telecommunications network 3.

The subscriber will thereafter be authenticated by the service gateway 44 performing a challenge and response session with the SIM (by sending data via the authenticator module 30)—step J. The service gateway 44 will send a random challenge to the authenticator module 30, which is transmitted to the SIM 15. This challenge is sent as an OTA data packet that is encrypted using a selected key set in the manner described above. The SIM decrypts the OTA data packet using the corresponding key set stored on the SIM. The decrypted challenge is then extracted. The SIM 15 responds by encrypting the random challenge using both an authentication algorithm and a unique key Ki resident within the SIM 15 and assigned to that particular subscriber. The response is encrypted using the selected key set and encapsulated in an OTA data packet with a header indicating the key set used (and also the nature and destination of the OTA data packet). The OTA data packet is transmitted to the service gateway 44 via the authenticator module 30. The service gateway 44 decrypts the OTA data packet using the key set data obtained from the SIM management function 50 via the ID provider 46. The decrypted SIM response is then passed to the ID provider 46. The ID provider 46 analyses the response to determine whether it is the response that would be expected from that subscriber's SIM 15. If the response is as expected, then the service gateway 44 issues a security token $S_X$ and sends this to the authenticator module 30 (step K). The authenticator module 30 itself need not understand the data exchanged during the challenge and response procedure—it merely acts as a conduit for this data—indeed, it will not be able to decrypt the OTA data packets because the key sets are not known to it.

As an additional security measure, the OTA challenge data packet generated by the service gateway 44 may include a SIMTALK command which requires the subscriber to provide some security data, such as a PIN or biometric data. This SIMTALK command is extracted and executed by the SIM. The SIM then sends a command to the SIM device 32 to prompt the user to enter their PIN using the buttons 56 (or to provide biometric data). The PIN (or biometric data) is encapsulated in the encrypted response OTA data packet, and is compared with a pre-stored PIN or biometric data that the subscriber has previously provided to the ID provider 46.

The SIM 15 includes secret data such as the authentication algorithm and the unique key Ki. It is important that this data is not obtained by an unauthorised party. When a SIM is used in conjunction with a mobile telephone handset to make and receive calls in the normal manner, the secret data on the SIM is not vulnerable because access to the SIM is by a mobile telephone handset which operates according to strict international standards. Only mobile telephone handsets that comply with these standards are allowed to be used in conjunction with the SIM and a mobile telecommunications network. However, when, as is envisaged in the present embodiment, the SIM is coupled to a PC 23, the secret data on the SIM may potentially be accessed by any application on or which accesses the PC 23. Therefore, the secret data on the SIM 15 is much more vulnerable to unauthorised access than when the SIM is used in a mobile telephone handset in the conventional way.

In accordance with a feature of the embodiment, the SIM 15 is configured to only allow limited access to the data on the SIM by the PC 23. There may be several different SIM security modes, which may be selectable by the user or network 3.

In mode 1 it is only possible for an application on the PC 23 to read identification data such as the SIM ID, SIM issuer ID and service gateway 44 and ID provider 46 address. It is not possible for the PC 23 to retrieve any other data from the SIM 15, thereby protecting the secret data stored on the SIM 15.

In mode 2 communications between the SIM 15 and the PC 23 are encrypted. The only application of the PC 23 that is allowed to access the SIM 15 is the authenticator module 30. The software to implement the authenticator module 30 includes a public-private key pair. These keys may be installed on the PC 23, together with the authenticator module software, prior to distribution of the PC 23 to the subscriber. Alternatively, the authenticator module 30 software and the keys may be distributed to the subscriber on a recordable media, such as a CD-rom, for installation on the PC 23. When the PC 23 is initially powered-up, or when the SIM 15 is newly connected to the PC 23 using the dongle 34, the SIM 15 issues a SIMTALK command to the authenticator module to request its public key and certificate. The SIM 15 has pre-stored thereon the root certificate associated with the authenticator module 30, and is able to check that the certificate of the authenticator module 30 is valid. The SIM 15 determines that the authenticator module's 30 certificate is valid, the SIM 15 generates a session key and sends this to the authenticator module 30. The authenticator module 30 then uses this key to encrypt communications with the SIM 15. Knowledge of the session key enables the SIM 15 to decrypt these communications. The SIM 15 can therefore assume that any communications encrypted using the session key are from a trusted authenticator module (by virtue of that authenticator module having a valid certificate). Advantageously, the network 3 provides the SIM 15 with an update of valid certificates from time to time. If the network 3 becomes aware that an authenticator module 30 has been compromised in some way, its certificate will be revoked, and this will be communicated to the SIM 15. When the authenticator module 30 sends its public key and certificate to the SIM 15 (for example at power-up of the PC 23), the SIM 15 will detect that the certificate has been revoked, and will not issue a session key, so that communication between the authenticator module 30 and the SIM 15 in this security mode is not possible.

Security mode 3 has been described in detail above, and allows an OTA communication channel to be established between the SIM 15 and the service gateway 44. However, such an OTA communication channel can only be used to transmit SIMTALK commands to the SIM 15 when the GSM/3G challenge and response procedure has been completed successfully. That is, communication in this security mode will only be possible between the service gateway 44 and the SIM 15. Although the OTA data packets are transmitted via the authenticator module 30, the authenticator module 30 will not be able to access the content of the data packets as they are encrypted using key sets known only to the ID provider 46 (and the SIM management function 50) and the SIM 15.

Security mode 4 is similar to security mode 2; however there is no pre-required procedure for interaction with any other modes. Security mode 4 is typically used for communicating Network Access credentials such as WLAN. For the WLAN authentication this option always requires the WLAN to terminate any cryptographic authentication processing on the SIM, i.e. the EAP-Client should reside on the SIM rather with the PC application.

Other selectable security modes may also be provided.

Figure 5B:
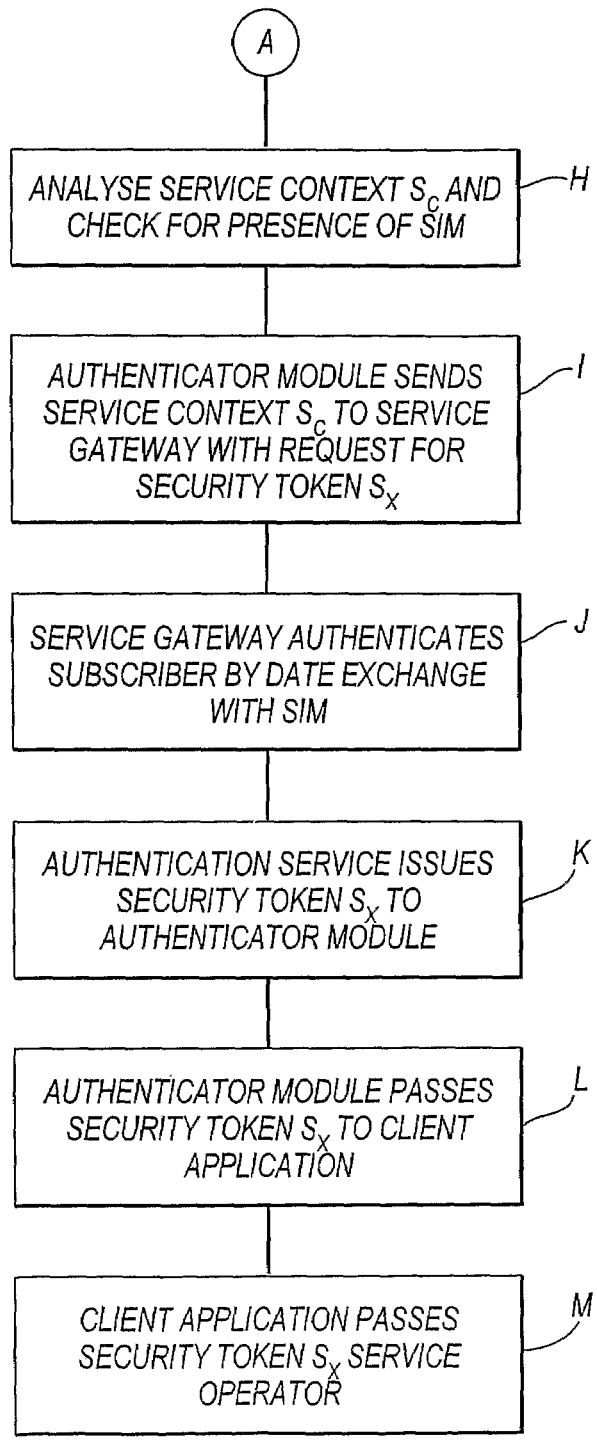

Referring again to the flow chart of FIG. 5B, after authentication has been completed successfully, if a payment for the transaction is required, details of the required payment are included in the service context $S_C$. This information is extracted from the service context $S_C$ by the service gateway 44. The service gateway 44 may then send a message to the payment provider 48 which reserves funds in the subscriber's account with the network 3.

The security token $S_X$ is passed to the client application 38 (step L).

The client application 38 then passes the security token to the service operator 40 (step M).

The security token $S_X$ includes data specific to a particular subscriber and a transaction with a particular by the service operator 40. Numerous transactions may be handled by the network 3, authenticator module 30 and service operator 40 in parallel. These will be distinguishable from one another by virtue of the data specific to a particular transaction with a particular by the service operator 40 in the security token $S_X$.

If the security token $S_X$ is intercepted as it passes between the network 3 and the authenticator module 30 or between the client application 38 and the service operator 40, it will have no value to the interceptor. The security token $S_X$ is specific to particular transaction with a particular by the service operator 40, and the provision of a service to a particular subscriber.

On receipt of the security token $S_X$ by the service operator 40 its content is analysed and, if it is established that it corresponds to a service context Sc issued by the service operator 40, the service operator 40 may assume that the request for service (order of a CD) is legitimately made by the subscriber. The service operator 40 could present the Security Token Sx to the Identity Provider 46 to check the validity of the token. The Identity Provider 46 then checks the integrity of the Security Token Sx (e.g. checks whether it was issued by the identity provider 46 or another, trusted identity provider) and validates the content of the Security Token Sx. The identity provider 46 then sends a response to the service operator 40 indicating that the Security Token Sx is valid. Alternatively, the service gateway 44 may send data to the service operator 40 that allow the service operator 40 itself to determine the integrity and validity of the Security Token Sx. The CD can then be despatched. If a payment is required, the service provider 22 may generate a payment context $P_C$ and use this to obtain payment from the user's account with the network 3 in the manner described in WO-A-2004 036513. Of course other methods of obtaining payment may be used.

The communications between the PC 23 and the network 3 are preferably encrypted, as described above. It is also preferable for communications between the components within the PC 23 and within the network 3 to be encrypted—for example by use of shared keys. The PC 23 described in the embodiment above may be modified in accordance with an aspect of the present invention to include an integral data card module (that is, apparatus for communicating wirelessly with the radio access network of the telecommunications network 3). In order to allow a so-equipped PC 23 to communicate with the mobile telecommunications network 3, the SIM 15 must be associated with the module to facilitate authentication with the network 3. Advantageously, the SIM 15 is readily removable from the PC. For example, the SIM may be removably inserted in a SIM card receiving slot provided on the PC or connected to the PC using a dongle in the manner described above. If the data card module were accessed via the operating system of the PC 23, this would mean that any authentication data transmitted between the SIM 15 and the module might be accessible by any software on the PC. This might mean that the authentication data would become known to an unauthorised party. In accordance with this aspect of the embodiment, the data card module is configured so that it communicates with the SIM 15 (only) via the BIOS (basic input/output system) of the PC 23. Therefore communications between the SIM 15 and the module can be made without transmitting authentication data via the operating system.

The invention claimed is:

1. A method of authenticating an entity, the method being performed at a data processing apparatus having authentication storage means coupled thereto, the authentication storage means having authentication information stored thereon, the method comprising:

receiving, from a remote service operator, a service message requesting authentication of an entity;

in response to the received service message:

coupling the authentication storage means to a service gateway of a communications network; and facilitating the exchange of authentication data between the authentication storage means and the service gateway to authenticate the entity with the service gateway, wherein the authentication data is exchanged between the authentication storage means and the service gateway in messages having a predetermined message format using a bearer independent protocol that is recognizable and transmissible by the data processing apparatus and the service gateway and each device therebetween through which the authentication data passes, which message format is also used to transmit non-authentication data by each of said elements;
receiving, from the service gateway, an authenticating message indicating authentication of the entity; and
transmitting, to the remote service operator, a message comprising results of the authentication of the entity.

2. The method of claim 1, wherein the authentication storage means comprises a smart card.

3. The method of claim 1, wherein the authentication storage means comprises a subscriber identity module (SIM).

4. The method of claim 2, wherein the authentication information stored on the authentication storage means comprises data for authenticating the entity with a GSM or UMTS (3G) mobile telecommunications network.

5. The method of claim 4, wherein the authentication information stored on the authentication storage means is usable to authenticate a mobile telephone handset with the mobile telecommunications network.

6. The method of claim 1, wherein the communications network comprises a GSM or UMTS mobile telecommunications network.

7. The method of claim 1, wherein the communications network comprises the Internet.

8. The method of claim 1, further comprising coupling the authentication storage means to the data processing apparatus.

9. The method of claim 8, wherein coupling the authentication storage means to the data processing apparatus comprises coupling the authentication storage means to the data processing apparatus via a carrier.

10. The method of claim 9, wherein the authentication data is exchanged between the authentication storage means and the service gateway via the carrier.

11. The method of claim 9, further comprising receiving, from the carrier, identity data.

12. The method of claim 11, wherein the identity data comprises a PIN or biometric data.

13. The method of claim 11, further comprising transmitting the identity data to the service gateway for use in authenticating the entity.

14. The method of claim 8, further comprising:
transmitting security data from the data processing apparatus to the authentication storage means;
using the authentication storage means to check the validity of the security data; and
only exchanging selected data with the data processing apparatus if the security data is determined to be valid by the authentication storage means.

15. The method of claim 1, wherein the authentication storage means and the service gateway employ an encryption and decryption scheme when exchanging the authentication therebetween.

16. The method of claim 1, wherein authentication data is transmitted between the data processing apparatus and the authentication storage means via a Basic Input/Output System (BIOS) of the data processing apparatus.

17. The method of claim 1, wherein facilitating the exchange of authentication data is performed by an authenticator module running on the data processing apparatus, the authentication data being exchanged between the authentication storage means and the service gateway through the authenticator module, the authenticator module using the predetermined message format using the bearer independent protocol.

18. The method of claim 17, wherein the authentication storage means comprises a subscriber identity module (SIM) and wherein facilitating the exchange of authentication data comprises facilitating a challenge and response session between the service gateway and the SIM.

19. The method of claim 18, wherein the challenge and response session comprises:
receiving, by the authenticator module from the service gateway, a challenge message;
passing the received challenge message from the authenticator module to the SIM;
generating, by the SIM, a response message to the received challenge message;
passing the response message from the SIM to the authenticator module; and
transmitting, by the authenticator module to the service gateway, the response message.

20. The method of claim 17, wherein the message format corresponds to an Over The Air (OTA) message format.

21. The method of claim 1, further comprising transmitting, to the remote service operator, a request for the service message, the request comprising data identifying the entity, wherein the service message is received from the remote service operator in response to the request.

22. The method of claim 1, wherein the data processing apparatus is uncoupled to a mobile telecommunications network.

23. The method of claim 1, wherein the entity is a subscriber registered with a telecommunications network and the authentication storage means comprises a subscriber identity module (SIM).

24. The method of claim 1, wherein the authentication message received from the service gateway comprises a security token that authenticates the entity, and the information regarding the authentication of the entity transmitted to the remote service operator comprises the security token.

25. The method of claim 1, further comprising determining whether the authentication storage means is coupled to the data processing apparatus and if not, prompting the user to couple the authentication storage means to the data processing apparatus.

26. The method of claim 1, wherein the service message identifies a requested transaction between the entity and the remote service operator.

27. The method of claim 26, further comprising:
displaying to a user a description of the requested transaction received in the service message; and
receiving input from the user indicating that the user approves of the requested transaction.

28. The method of claim 26, further comprising transmitting details of the requested transaction to the service gateway for use in authenticating the entity.

29. The method of claim 26, wherein details of the requested transaction are included in the authentication data exchanged between the authentication storage means and the service gateway.

30. A system for authenticating an entity, the system comprising:
a data processing apparatus comprising:
means for receiving a service message from a remote service operator requesting authentication of an entity;
authentication storage means having authentication information stored thereon;
an authenticator module that couples with the authentication storage means; and
means for transmitting a message to the remote service operator presenting results of the authentication of the entity;

a service gateway of a communications network, the authenticator module coupling with the service gateway to facilitate the exchange of authentication data between the authentication storage means and the service gateway to authenticate the entity with the service gateway, the authenticator module being configured to pass authentication data received from the authentication storage means to the service gateway and pass authentication data received from the service gateway to the authentication storage means, the authentication data being exchanged in messages having a predetermined message format using a bearer independent protocol that is recognizable and transmissible by the authenticator module and the service gateway, which message format is also used to transmit non-authentication data by the authenticator module and the service gateway.

31. The system of claim 30, wherein the message format corresponds to an Over The Air (OTA) message format.

32. An apparatus comprising:
means for receiving a service message from a remote service operator requesting authentication of an entity;
authentication storage means having authentication information stored thereon;
an authenticator module that couples with the authentication storage means and is configured to couple to a service gateway of a communications network to facilitate the exchange of authentication data between the authentication storage means and the service gateway to authenticate the entity with the service gateway, the authenticator module being configured to pass authentication data received from the authentication storage means to the service gateway and pass authentication data received from the service gateway to the authentication storage means, the authentication data being exchanged in messages having a predetermined message format using a bearer independent protocol that is recognizable and transmissible by the authenticator module and the service gateway, which message format is also used to transmit non-authentication data by the authenticator module and the service gateway; and
means for transmitting a message to the remote service operator presenting results of the authentication of the entity.

33. The apparatus of claim 32, wherein the predetermined message format corresponds to an Over The Air (OTA) message format.

34. The apparatus of claim 32, wherein the authentication storage means comprises a smart card.

35. The apparatus of claim 34, wherein the authentication storage means comprises a subscriber identity module (SIM).

36. The apparatus of claim 34, wherein the authentication storage means includes data for authenticating the entity with a GMS or UMTS (3G) mobile telecommunications network.

37. The apparatus of claim 36, wherein the authentication information stored on the authentication storage means is usable to authenticate a mobile telephone handset with the mobile telecommunications network.

38. The apparatus of claim 32, wherein the authentication storage means is removable from the apparatus.

* * * * *